United States Patent [19]

Swaidan

[11] 4,235,679
[45] Nov. 25, 1980

[54] HIGH PERFORMANCE SOLAR STILL

[75] Inventor: Brian E. Swaidan, Ventura, Calif.

[73] Assignee: The United States of America as represented by the Secretary of the Navy, Washington, D.C.

[21] Appl. No.: 3,181

[22] Filed: Jan. 15, 1979

[51] Int. Cl.³ ............................................. B01D 3/00
[52] U.S. Cl. ............................. 202/234; 203/DIG. 1; 202/176
[58] Field of Search .............. 202/234, 196, 203, 205, 202/181, 173, 236; 203/DIG. 1, 10, 100; 126/432

[56] References Cited

U.S. PATENT DOCUMENTS

| | | | |
|---|---|---|---|
| 3,655,517 | 4/1972 | Hensley, Jr. et al. | 202/234 |
| 3,880,719 | 4/1975 | Massie | 202/234 |
| 4,055,473 | 10/1977 | Hay | 202/234 |
| 4,077,849 | 3/1978 | Ziehm, Jr. | 202/205 |
| 4,138,293 | 2/1979 | Ziehm, Jr. | 202/234 X |

*Primary Examiner*—George T. Hall
*Attorney, Agent, or Firm*—Richard S. Sciascia; Joseph M. St. Amand

[57] ABSTRACT

A solar still into which cold seawater is fed by means of a pipe perforated along its horizontal length. The seawater then flows down an inclined plane through a black wick material placed on top of a double or parallel plate base which serves as a heat exchanger that transfers heat from a working fluid to the seawater. The seawater in turn evaporates while flowing down the wick and the vapor condenses as pure water on the upper inner surface of the still transferring heat back to the working fluid which is being circulated through the upper cover of the still. The vapor condensate is collected as it flows down the inclined upper inner surface and in turn is drawn off; the working fluid is recirculated to continuously heat and then cool the distillate.

25 Claims, 6 Drawing Figures

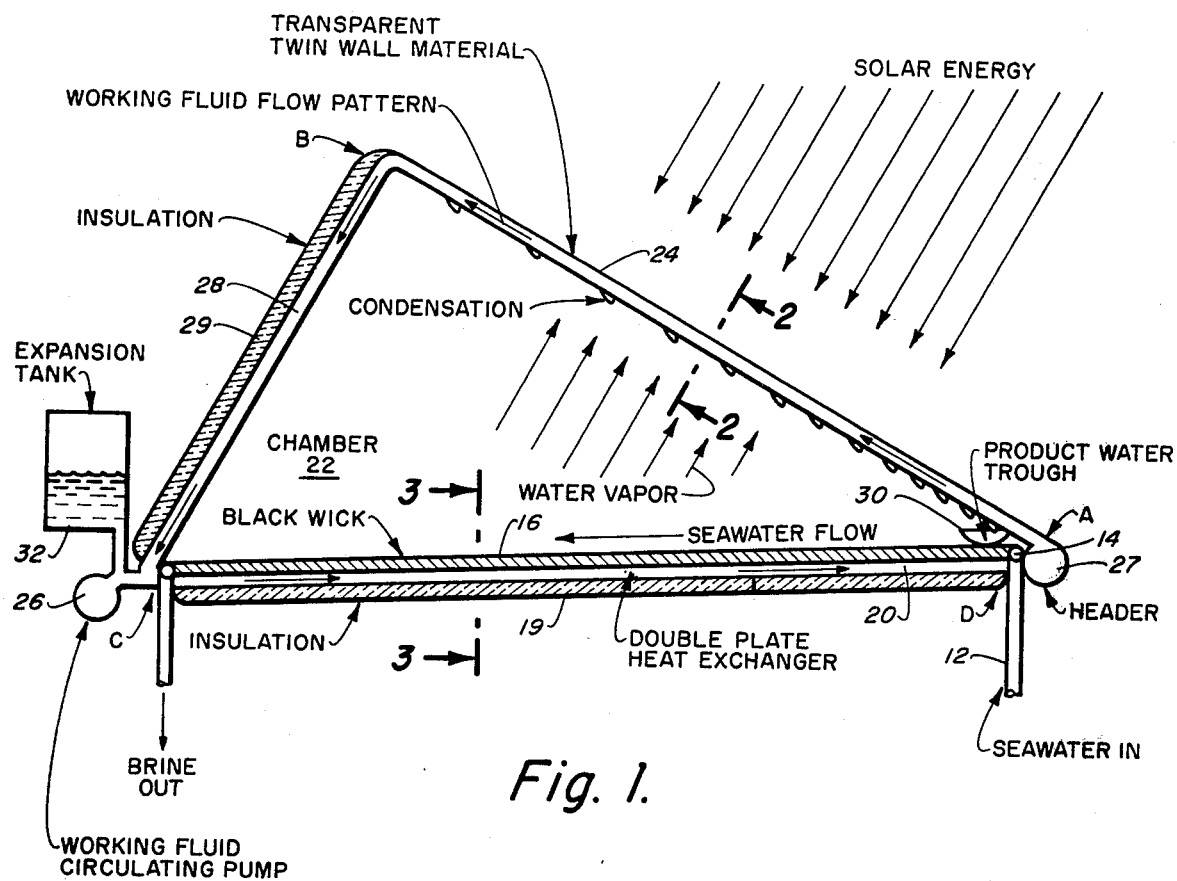
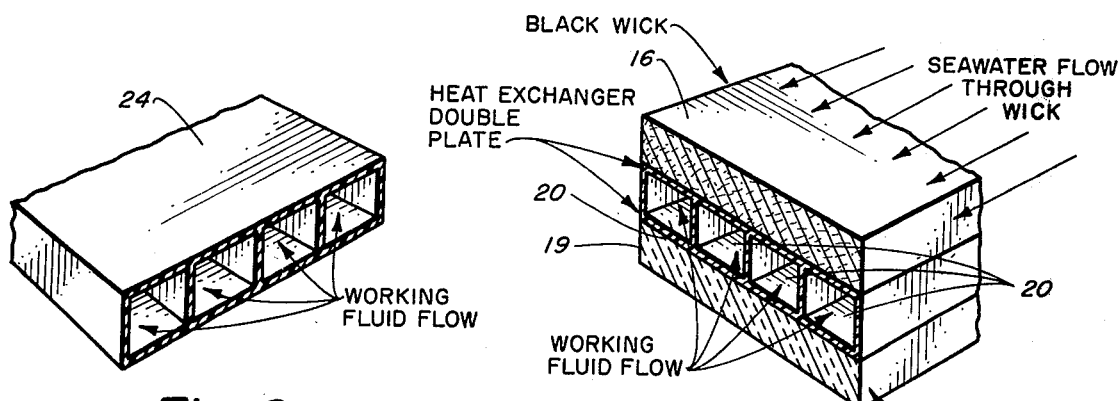

HIGH PERFORMANCE SOLAR STILL

BACKGROUND

The present invention relates to solar stills and particularly to a more efficient use of solar energy for the production of fresh water from seawater.

Solar distillation is a well known concept for conversion of seawater into fresh water. Numerous geometric designs have been introduced by various individuals over the past three decades to increase the efficiency of producing and thereby the productivity of fresh water from seawater. However, higher efficiency concepts suffered from higher costs and became economically unattractive and, therefore, uncompetitive. Finally, since the thermodynamics and geometric effects of solar distillation are well understood, it is generally agreed that the simple solar still design has the best immediate potential. Nevertheless, the simple solar still design requires a high ratio of basin area to fresh water production; (10 to 15 ft$^2$/1 gallon of fresh water per day). Such a performance has rendered the simple solar still ineffective when compared to conventional means for seawater conversion, i.e. multi-stage flash, vapor compressionn, reverse osmosis, etc.

The present invention is a dramatic improvement over the simple solar still, and uses a double transparent and a double plate heat exchanger through which a working fluid is circulated for first heating the seawater and then condensing the seawater vapor. The distillate is then drawn off as pure water.

It is an object of the invention, therefore, to provide an efficient use of solar energy for the production of fresh water from seawater.

It is also an object of the invention to provide a highly-efficient and non-polluting solar still for producing fresh water from seawater.

Other objects and a more complete appreciation of the present invention and its many attendant advantages will develop as the same becomes better understood by reference to the following detailed description when considered in connection with the accompanying drawings in which like reference numerals designate like parts throughout the figures thereof and wherein.

BRIEF DESCRIPTION OF THE DRAWINGS

FIG. 1 is a diagrammatic illustration of a preferred embodiment of the high performance solar still of the present invention.

FIG. 2 is an illustration of section 2—2 of FIG. 1.

FIG. 3 is an illustration of section 3—3 of FIG. 1.

DESCRIPTION OF THE PREFERRED EMBODIMENTS

Figure 4:
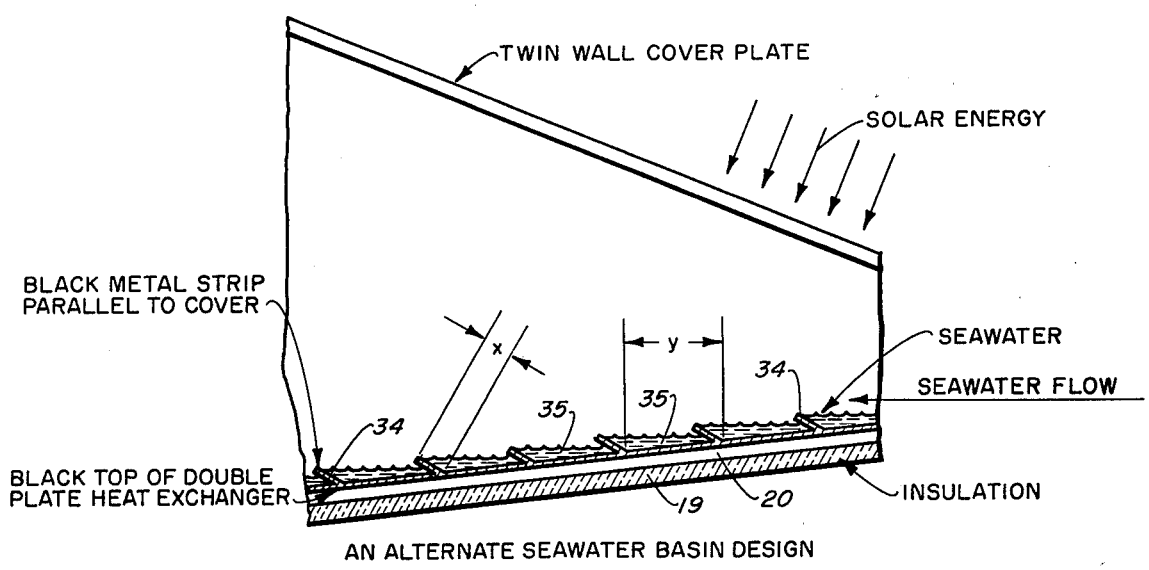
FIG. 4 is a diagrammatic illustration of another embodiment of the invention using a seawater basin in place of the black wick material.

FIG. 1 shows a preferred embodiment of and illustrates the operation of the High Performance Solar Still of the present invention. Cold seawater is fed into the still at inlet 12 by means of a pipe which is perforated along its horizontal length at 14 inside the still. The seawater is then allowed to flow, by gravitational force, down an inclined plane through a certain thickness of a black wick material 16 placed on the black top of a double (i.e. parallel) plate base 18 insulated at 19 with an insulation layer. Parallel plate base 18 serves as a heat exchanger transferring the heat from the working fluid, which flows through channels 20 therein, to the seawater flowing down through the wick 16.

The following sequence describes the operation of the solar still:

At start-up, solar energy enters the still chamber 22 through a twin wall transparent window 24 and warms up the seawater soaked black wick 16 causing a certain amount of vaporization to occur.

As more solar energy is absorbed by black wick 16, and the wick reaches a predetermined temperature, the working fluid circulating pump 26 will be activated for pumping the working fluid throughout the system in the direction of the arrows through double plate heat exchanger 20, header 27, twinwall window 24, conduit 28 and return to circulation pump 26. Conduits 28 are also insulated at 29 along the outer wall.

At point A along the course of flow, the working fluid is at its lowest temperature as it begins to flow upward through the twin wall transparent cover material 24.

As the working fluid flows toward point B, its temperature rises as it recaptures the heat of condensation from the condensing water vapor. The condensed water vapor runs down the inner surface of the twin wall transparent cover 24 where it is collected at a water trough 30 and drawn off.

Meanwhile, the vapor condensation process on the inside of the twinwall cover will be enhanced due to circulation of the working fluid. It should be noted that more condensation will occur nearest point A because the working fluid inside of cover 24 is lowest in temperature at that point.

At point B the working fluid will be at its highest temperature due to the recapture of the heat of condensation.

At point C the working fluid again begins to flow through the double or parallel plate heat exchanger 20 and thus gives up its recaptured heat of condensation to vaporize the seawater flowing through the black wick material 16.

Also, at point C, the seawater is at its highest temperature and, consequently, more vaporization occurs near this end of the system.

At point D, the working fluid has given up most of its recaptured heat of condensation and is at its lowest temperature, and the cycle is then repeated. Further cooling of the working fluid might be desired after leaving point D before entering the header at point A. This would depend on the economic feasibility of such a scheme.

Any losses in the system are made-up by the constant input of solar energy. A desirable working fluid for such a system would simply be distilled water although other suitable fluids can be used. This system operates at a high efficiency and improves upon the simple solar still by having a working fluid recapture the heat of condensation and transferring the captured heat directly to vaporize seawater.

The twinwall cover 24 can be made from "TUF-FAK-TWINWAL" polycarbonate material and can be bent at point B into an "L" shaped cover, as shown in FIG. 1. However, a cheaper insulating material or simply two parallel plates can be used for conduit 28 from point B to point C with headers (similar to 27) to join them to the twinwall cover 24 at point B and the heat exchanger at point C. In a practical sense, however, a return line conduit 28 from point B to point C and a single insulating panel 29 will suffice. Furthermore, other type plastic materials with the general configuration of the twinwall cover shown or plain tempered glass panels having the desirable properties required by a solar still cover can be used.

Other options for the still cover are: First, two parallel plastic plates (e.g. $\frac{1}{8}$" thick or more) having plastic rods that run lengthwise along the flow pattern placed between the plates as spacers to facilitate the working fluid flow. The space thickness between the plates being determined by the rod diameter. In addition, the spacer rods will add rigidity to the two parallel plastic plates. Second, instead of plastic plates, thin plastic sheets (nylon, tedlar, polyethylene, etc.) can be used with plastic rods to separate the two sheets and provide space for the working fluid flow as with the plastic plates. Since the thin plastic sheets are the least expensive, this type of cover can be designed to be of the disposable type.

An expansion tank 32 can be provided, as shown in FIG. 1 to handle excess working fluid as it expands. However, this tank can be eliminated if the working fluid circulation system is designed to withstand the pressure rise as the working fluid heats up and expands.

An alternative to the black wick material is to use the black top side of the double plate heat exchanger 20 as the seawater basin. FIG. 4 shows strips 34 of black metal placed at desired intervals across the seawater flow pattern to form a plurality of basins 35. The spacing distance "y" and the metal strip width distance "x" must be such as to allow complete coverage of the basin area with seawater. The metal strips 35 can be fastened by any suitable means, for example, they can be welded onto the basin surface, or the basin plate might have pre-extruded "L" grooves for the metal strips to slide into, etc.

Figure 5:
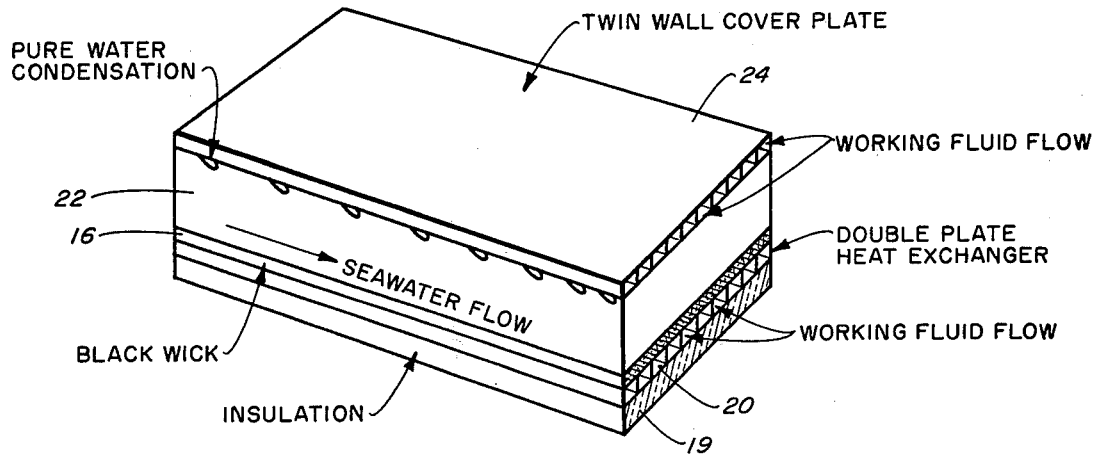
FIG. 5 shows still another embodiment of the invention using a "sandwich design" for the high performance solar still.
Figure 6:
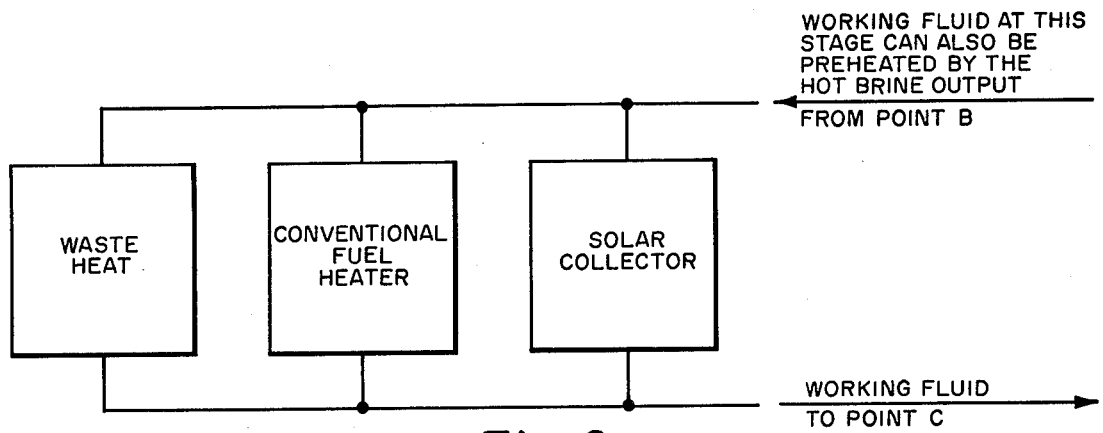
FIG. 6 shows alternate means for preheating the working fluid used in the solar still.

Another alternative to the solar still geometry of FIG. 1 is the "sandwich design" shown in FIG. 5. In this design, the seawater basin is parallel to the cover plate and the evaporation space is much smaller. This results in a more compact design and probably a more practical unit. Return lines are used to transfer the working fluid from the top of the cover plate to the entry of the double plate heat exchanger and via versa.

FIG. 4 shows alternative means to further heating the working fluid so as to increase the solar still efficiency. A conventional fuel heater could allow for 24 hour operation of the solar still by providing the necessary heat at night or on cloudy days. Also, a solar collector can be used, or otherwise waste heat can be used to further heat the working fluid.

Obviously, many modifications and variations of the present invention are possible in light of the above teachings. It is therefore to be understood that within the scope of the appended the invention may be practiced otherwise than as specifically described.

What is claimed is:

1. A high performance solar distillation apparatus for vaporization and condensation of pure water from saline and brackish waters, comprising:
   a. a generally flat double plate heat-exchanger base means having passage means therethrough for the flow of a heat transfer working fluid from one end of the apparatus base to the other;
   b. a twinwall cover means having passage means between the twin walls and being transparent to solar energy; said cover means mounted above said heat-exchanger base means so as to form a chamber between said transparent cover means and said base means; said chamber being completely enclosed by walls on all remaining sides thereof; and said twinwall transparent cover means being positioned at an incline to the horizontal when the apparatus is in operating position;
   c. said passage means in said heat-exchanger base means and in said transparent cover means being filled with a heat-exchanger working fluid;
   d. a first conduit means connecting one end of the passage means of said double plate heat-exchanger base means to one end of the passage means in said twinwall transparent cover means, and a second conduit means connecting the other end of said passage means in the twinwall transparent cover means to the other end of the passage means in said double plate heat-exchanger base means to allow complete flow of the working fluid through said heat-exchanger base means through said transparent cover means and return to the heat-exchanger base means;
   e. a pump means operable to continuously circulate said working fluid as desired through said heat-exchanger base means, said twinwall transparent cover means and said first and second conduit means;
   f. an inlet means at one end of said apparatus for introducing saline waters to flow into said chamber and across the upper surface of said heat-exchanger base means; an outlet means at the opposite end of said apparatus for withdrawing concentrated saline waters following evaporation and condensation as pure water on the inner surface of said transparent cover means of at least a portion of the introduced saline waters;
   g. means for activating said pump means when solar energy entering said apparatus chamber through said twinwall transparent cover means impinges upon and heats to a predetermined temperature the upper surface of said double plate heat-exchanger means and the saline waters flowing across the upper surface of the surface thereof causing certain vaporation of the water;
   h. said working fluid as it flows through said twinwall transparent cover operating to recapture the heat of condensation as water vapor condenses on the inner surface of said twinwall transparent cover means;
   i. means for collecting said pure water condensation and removing same from said chamber;
   j. said working fluid from said twinwall transparent cover means flowing though said double plate heat-exchanger base means in turn giving up its recaptured heat of condensation to enhance the vaporization of additional saline water flowing across the upper surface of said heat-exchanger base means.

2. Apparatus as in claim 1 wherein the upper surface of said double plate heat-exchanger means is black.

3. Apparatus as in claim 1 wherein the upper surface of said double plate heat-exchanger means is covered with a heat-absorbing wick-like material through which the introduced saline waters flow.

4. Apparatus as in claim 3 wherein said heat-exchanger wick-like material is black.

5. Apparatus as in claim 1 wherein said double plate heat-exchanger means is at an incline to the horizontal to allow gravity flow of the saline waters from the inlet means to the outlet means.

6. Apparatus as in claim 1 wherein all exterior walls including the bottom of the heat-exchanger base means and excluding the transparent cover means are insulated to reduce loss of heat from within said chamber.

7. Apparatus as in claim 1 wherein said transparent cover means comprises a parallel pair of transparent panels spaced apart with channel forming plastic rod type spacers that run lengthwise along the flow pattern of the working fluid.

8. Apparatus as in claim 1 wherein an expansion tank means is provided in the working fluid circulation system to handle excess working fluid as it heats up and expands.

9. Apparatus as in claim 1 wherein the circulation system formed by the passageways and conduits through which the working fluid flows is designed to withstand the pressure rise as the working fluid heats up and expands.

10. Apparatus as in claim 1 wherein the upper side of said double plate heat-exchanger means is provided with a plurality of parallel troughs for cascading the saline waters under gravity flow from one trough to the next.

11. Apparatus as in claim 1 wherein said means for collecting said pure water condensation comprises a trough along the lowest edge of said twinwall transparent cover whereby water vapor condensing on the inner surface of said transparent cover flows downward and runs into said trough where it can be drawn off through a pure water outlet means.

12. Apparatus as in claim 1 wherein the general cross-sectional side view configuration is trapezoidal.

13. Apparatus as in claim 1 wherein the flow of working fluid through the heat-exchanger base means is in a direction opposite to the flow of saline waters over the upper surface thereof.

14. Apparatus as in claim 1 wherein the flow of working fluid through said twinwall transparent cover means is up an incline and opposite to the flow of pure water condensation down the inner surface of said transparent cover means.

15. Apparatus as in claim 1 wherein the general cross-sectional side view is a sandwiched configuration where the twinwall transparent cover means is substantially parallel to the double plate heat-exchanger base means.

16. Apparatus as in claim 15 wherein said sandwiched configuration is positioned at an incline to the horizontal for gravity flow of the saline waters across said heat-exchanger base means.

17. Apparatus as in claim 1 wherein the working fluid flow through both said heat-exchanger base means and through said twinwall transparent cover means is up an incline.

18. Apparatus as in claim 1 wherein said twinwall transparent cover is made from a polycarbonate material.

19. Apparatus as in claim 1 wherein a source of additional heating is provided to the working fluid between leaving the twinwall transparent cover means and entering said double plate heat-exchanger base means.

20. Apparatus as in claim 1 wherein said second conduit means is constructed similar to said twinwall transparent cover means.

21. Apparatus as in claim 1 wherein said double plate heat-exchanger base means comprises two spaced-apart plates connected together by elongated spacers which form channels along the direction of working fluid flow.

22. Apparatus as in claim 1 wherein said saline waters are fed from said inlet means through a perforated pipe means along the upper end of said heat-exchanger base means.

23. Apparatus as in claim 1 wherein said pump means is automatically activated for circulating said working fluid when the upper surface of said heat-exchanger base means reaches a predetermined temperature; said recirculating working fluid continuously heating the saline waters to evaporate and then cooling the water vapor to condense on the inner surface of said transparent cover means.

24. Apparatus as in claim 1 wherein the working fluid is distilled water.

25. Apparatus as in claim 1 wherein a solar collector unit is used to augment the heating of the working fluid.

* * * * *